(12) United States Patent
Linnet

(10) Patent No.: US 10,694,759 B2
(45) Date of Patent: Jun. 30, 2020

(54) HOT ETHANOL EXTRACTION OF LIPIDS FROM PLANT OR ANIMAL MATERIALS

(71) Applicant: Alfa Laval Corporation AB, Lund (SE)

(72) Inventor: Lars Linnet, Copenhagen O (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/433,577

(22) PCT Filed: Oct. 4, 2012

(86) PCT No.: PCT/EP2012/069594
§ 371 (c)(1),
(2) Date: Apr. 3, 2015

(87) PCT Pub. No.: WO2014/053180
PCT Pub. Date: Apr. 10, 2014

(65) Prior Publication Data
US 2015/0245629 A1    Sep. 3, 2015

(51) Int. Cl.
*C11B 1/10* (2006.01)
*C11B 1/04* (2006.01)
(Continued)

(52) U.S. Cl.
CPC .............. *A23D 9/04* (2013.01); *A23D 9/02* (2013.01); *C11B 1/02* (2013.01); *C11B 1/04* (2013.01);
(Continued)

(58) Field of Classification Search
USPC .......................................................... 426/478
See application file for complete search history.

(56) References Cited

U.S. PATENT DOCUMENTS

| 3,323,575 A | 6/1967 | Greenfield |
| 3,970,764 A | 7/1976 | Karnofsky |

(Continued)

FOREIGN PATENT DOCUMENTS

| GB | 1 526 553 | 9/1978 |
| WO | WO 89/01294 A1 | 2/1989 |

(Continued)

OTHER PUBLICATIONS

International Search Report (PCT/ISA/210) dated Apr. 22, 2013, by the European Patent Office as the International Searching Authority for International Application No. PCT/EP2012/069594.

(Continued)

*Primary Examiner* — Lien T Tran
(74) *Attorney, Agent, or Firm* — Buchanan Ingersoll & Rooney PC

(57) ABSTRACT

The present invention relates to a process for the production of a fat rich and a fat lean product from a plant or animal starting material, comprising the steps of:
i) providing a particulate fat containing starting material,
ii) mixing the particulate fat containing starting material with ethanol of at least 90% w/w concentration,
iii) heating the mixture,
iv) subjecting the heated mixture to a hydrocyclone treatment to provide a fat reduced underflow stream and an overflow stream,
v) recovering the fat lean product from the fat reduced underflow stream,
vi) recovering the fat rich product from the overflow stream. The fat rich and the fat lean products are suited for use in human food or for animal feed products.

23 Claims, 2 Drawing Sheets

(51) Int. Cl.
   *C11B 1/02*   (2006.01)
   *A23D 9/04*   (2006.01)
   *A23D 9/02*   (2006.01)

(52) U.S. Cl.
   CPC ............... *C11B 1/10* (2013.01); *C11B 1/102* (2013.01); *Y02E 50/13* (2013.01)

(56) References Cited

U.S. PATENT DOCUMENTS

| | | | |
|---|---|---|---|
| 4,154,728 A | | 5/1979 | Oughton |
| 4,211,695 A | | 7/1980 | Oughton |
| 4,486,353 A | | 12/1984 | Matsuzaki et al. |
| 4,619,789 A | * | 10/1986 | Strop ............... C11B 1/02 554/8 |
| 7,481,890 B2 | | 1/2009 | Cheryan |
| 7,569,671 B2 | | 8/2009 | Cheryan |
| 2006/0173169 A1 | | 8/2006 | Cheryan |
| 2008/0145511 A1 | * | 6/2008 | Irwin ............... A23J 3/16 426/657 |
| 2010/0112187 A1 | * | 5/2010 | Crank ............... A23C 11/103 426/656 |
| 2010/0173042 A1 | * | 7/2010 | McShea ............... A23G 1/0003 426/2 |

FOREIGN PATENT DOCUMENTS

| | | |
|---|---|---|
| WO | WO 2008/002154 A2 | 1/2008 |
| WO | WO 2011/100073 A2 | 8/2011 |

OTHER PUBLICATIONS

Written Opinion (PCT/ISA/237) dated Apr. 22, 2013, by the European Patent Office as the International Searching Authority for International Application No. PCT/EP2012/069594.

International Preliminary Report on Patentability (PCT/IPEA/409) dated Oct. 21, 2014, by the European Patent Office as the International Searching Authority for International Application No. PCT/EP2012/069594.

* cited by examiner

HOT ETHANOL EXTRACTION OF LIPIDS FROM PLANT OR ANIMAL MATERIALS

FIELD OF THE INVENTION

The present invention relates to a process for the production of a fat rich and a fat lean product from a plant or animal starting material. The fat rich product may for example be an oil, and relevant starting materials may be derived from, slaughterhouse by-products, marine materials, such as fish or fish by-products, or oil seeds. The fat rich and the fat lean product may be of food grade and may thus be employed in human food or for animal feed products.

BACKGROUND

In general several industrial scale techniques for the production of food grade oils or fats exist. Certain starting materials may be treated simply by pressing in order to provide an oil product from the material. However, other starting materials, e.g. oil seeds, typically require solvent based extraction to separate fats and oils from the material. Due to the hydrophobic nature of fats and oils these are commonly efficiently extracted with non-polar solvents, such as hexane. Non-polar solvents are generally incompatible with products for human or animal consumption and must carefully be removed from the extracted product to avoid the presence of potentially toxic or carcinogenic residues in the product. Furthermore, the use of such solvents represents a potential environmental hazard and may also be hazardous due to the risk of fire or explosions. Certain starting materials may furthermore be dehydrated prior to extraction of oil or fat. Several dehydration techniques are known in the art and typically comprise application of heat to remove water from the starting material. Another approach to dehydrate a fat containing starting material is the so-called Carver-Greenfield process described in U.S. Pat. No. 3,323,575.

U.S. Pat. No. 4,486,353 provides a method for extracting vegetable oil and fat from a flaked oleaginous material. The method of U.S. Pat. No. 4,486,353 may involve an initial step of drying the oleaginous material, which is in the form of flakes. Subsequently the flakes of the oleaginous material are contacted with ethanol of at least 90% purity and at a temperature between 70° C. and the boiling point to obtain miscella. The miscella are cooled to form an oil and defatted miscella. The ethanol may be removed from the defatted miscella to be recycled in the extraction. The method of U.S. Pat. No. 4,486,353 is limited to be operated at a temperature up to the boiling point of the ethanol solution, since the evaporation of ethanol will otherwise be too violent.

U.S. Pat. No. 4,211,695 provides a process for the treatment of comminuted oats so as to effect separation of the comminuted oats into fractions differing in composition, which comprise an oil fraction. The process of U.S. Pat. No. 4,211,695 involves admixing with and forming a slurry of comminuted oats in an organic solvent, which solvent is capable of extracting oat oil from the oats. The slurry is then subjected to the influence of centrifugal force to separate the comminuted oats in the slurry into at fractions. A preferred solvent is hexane, and when the slurry has been centrifuged the oil may be recovered by removal of the hexane. Preferred centrifugal separation are hydrocyclones and continuous centrifuges, such as a solid bowl centrifuge equipped with a screw conveyor. Heat treatment of the oats is avoided in U.S. Pat. No. 4,211,695 to facilitate separation of products of differing protein content. The process of U.S. Pat. No. 4,211,695 relies on hexane as a solvent and the choice of centrifugal separation appears to be based on characteristics of the particulate matter to be separated from the slurry, so that no specific advantages for the specified centrifugal separation principles employed are indicated.

There is thus a need to provide an improved process for the production of oil and other products from animal and plant starting materials. In particular, there is a need to provide a robust scaleable technology capable of efficiently producing food grade products at a reduced environmental risk. The present invention addresses one or more of these aims.

SUMMARY OF THE INVENTION

A first aspect the present invention relates to a process for the production of a fat rich and a fat lean product from a plant or animal starting material. The process comprises the steps of:
  i) providing a particulate fat containing starting material,
  ii) mixing the particulate fat containing starting material with ethanol of at least 90% w/w concentration,
  iii) heating the mixture,
  iv) subjecting the heated mixture to a hydrocyclone treatment to provide a fat reduced underflow stream and an overflow stream,
  v) recovering the fat lean product from the fat reduced underflow stream,
  vi) recovering the fat rich product from the overflow stream.

The present inventors have surprisingly found that fat and oil may be efficiently extracted from a fat containing material in a hydrocyclone using ethanol as the extractant.

The solubility of oil/fat in ethanol is depicted in FIG. 1, which shows the solubility as a function of temperature for different concentrations of ethanol in water. As is clear from FIG. 1 the solubility is dependent on temperature and water content, and as the temperature increases the solubility of fat increases exponentially. Thus, for example for absolute ethanol (i.e. 99.9% w/w) the exponential increase in solubility sets in at a temperature of about 60° C., whereas for lower concentrations of ethanol the exponential increase sets in at a temperature above the boiling point.

Conventional solvent extractors as used in the commercial bulk extraction of oil seeds are not suited for the extraction of meals using hot ethanol, as the meal compacts and clogs the perforated product cells and as it is a relatively open construction not ideally suited for operating with solvents at, near or above the boiling point.

The present invention utilises the finding, that hydrocyclones may be employed with hot ethanol, e.g. near or at or even above the boiling point. A hydrocyclone is designed to separate particles from a liquid, but the design and operation also allows the liquid phase in the hydrocyclone to extract matter from a solid, particulate material. Thus, the hydrocyclone allows processing of a mixture of a particulate fat containing starting material and ethanol, which is heated close to or above its boiling point to efficiently extract fat and oil into the ethanol while separating the fat reduced particulates from the ethanol/fat phase. The fat reduced particulates are present in the underflow from which the fat lean product can be recovered, while the fat rich product can be recovered from the ethanolic overflow stream. In summary, hydrocyclones are particularly suited, since one or more of the following advantages may be obtained:
  they are totally enclosed and can be operated at elevated pressure;

they are suitable for handling product milled into very fine particles, which also facilitates fast extraction rates;

they can operate in counter-current configuration;

they allow a high throughput and exhibit fast start-up and close down;

small solvent volumes reduce explosion and fire hazards.

In general, the higher the temperature the more efficient the extraction, and the temperature should be at least 60° C., although it is preferred that the temperature is at least 65° C., at least 70° C., such as at least 80° C., at least 90° C., or at least 100° C. A generally preferred range of temperatures is from 70° C. to 95° C., regardless of the ethanol concentration. Likewise, the higher the ethanol concentration the more efficient the extraction of fat. It is preferred that the ethanol concentration is at least 95% w/w, such as at least 98% w/w, at least 99% w/w, or at least 99.5% w/w. In general, there is no upper limit for the temperature, although the temperature may be controlled to be lower than 130° C. in order to secure safe operation of the hydrocyclone. Particularly preferred combinations of ethanol concentrations and temperatures are summarised in Table 1.

TABLE 1

Exemplary combinations of ethanol concentration and temperature

| Ethanol concentration | Temperature |
| --- | --- |
| 95.6% w/w (azeotropic) | 90° C. to 100° C. |
| 98% w/w | 75° C. to 85° C. |
| 99% w/w | 70° C. to 80° C. |
| 99.9% w/w (absolute) | 65° C. to 70° C. |

The feed pressure of the mixture applied to the hydrocyclone may be any value appropriate for the hydrocyclone type and size employed. The feed pressure will typically be in the range of from about 1 bar to about 10 bar, e.g. from about 4 bar to about 8 bar. The pressure drop between the feed and the overflow will typically be from about 1 bar to about 8 bar, e.g. from about 3 bar to about 6 bar, such as about 4 bar.

Any fat containing starting material of plant or animal origin may be processed according to the invention. Appropriate plant materials are plants conventionally used as raw materials for oil extraction, such as oil seeds. Materials of animal origin may be from any land or marine animal, and the starting material may be dehydrated meat or meat by-product, fish or fish material, such as by-product from industrially processed fish or whole fish or parts of fish.

The solids content of the mixture of the fat containing starting material and the ethanol will typically be between 10% w/w and 30% w/w, such as about 20% w/w.

It is advantageous for the process of the invention that the fat containing starting material has a low water content, such as 3% w/w or less. When the starting material has a water content below 3% w/w it is possible to avoid dehydrating side streams in the process of the invention so that the side streams may be recycling directly in the process. In an embodiment of the invention the process thus further comprises reducing the water content of the particulate fat containing starting material to below 3% w/w in the steps of:

a) mixing the particulate fat containing starting material with 1 to 20 parts fat or oil to obtain a slurry, b) heating the slurry to evaporate water and to obtain a water reduced slurry, c) subjecting the water reduced slurry to a solid-liquid separation to provide the particulate fat containing material having a water content below 3% w/w and an oil or fat fraction. The solid-liquid separation may be decanter technology.

In particular, step b) may be performed as a multi-step process comprising subjecting the water reduced slurry to sequential heat treatments, where each subsequent heat treatment is performed at a lower temperature than the preceding heat treatment. The dehydration process, also known as the "Carver-Greenfield process", is described in more detail in U.S. Pat. No. 3,323,575, in particular from column 6, line 35 to column 8, line 49, which are hereby incorporated by reference. This dehydration processing is advantageously compatible with the hydrocyclone extraction process. Despite it that the Carver Greenfield process has been known for more than 45 years it has not gained very widespread use, probably due to the fact that high levels of fat/oil may be absorbed in the dehydrated solids during the dehydration processing. However, in the present invention absorption of fat/oil is not considered problematic since the fats/oils are efficiently extracted in the following hydrocyclone processing. In a preferred embodiment the fat or oil mixed with the particulate fat containing starting material is derived from the fat rich product produced according to the process of the invention. This allows that an integrated process is set up where a stream of the fat rich product produced in the process of the invention is diverted to the dehydration process so that no external source of fat or oil is required in the dehydration step. The fat rich product may readily be recovered again from the oil phase after the dehydration processing.

In a specific embodiment of the invention the dehydration process is performed as a multi-step process comprising subjecting the water reduced slurry to sequential heat treatments, where each subsequent heat treatment is performed at a lower temperature than the preceding heat treatment. Adding several volumes of fat to a fine particulate solid makes a suspension, which will remain liquid even after removal of water. Hereby it is possible to utilise multi-effect evaporation equipment as dehydrating systems, thereby benefiting that energy consumption is reduced to 50% in a two effect system and down to only 33% in a 3 effect system. Thus, the dehydration process allows efficient control of the water content of the particulate fat containing starting material without requiring excessive heating. Since absolute ethanol has dehydration properties and readily absorbs water, it is advantageous that the starting material to be extracted has low water content. The Carver Greenfield oil drying process is very efficient in reaching near zero water levels in dehydrated products, e.g. reducing the water content to 3% w/w or less, such as 1% w/w. The combination of Carver Greenfield with hot-ethanol extraction is therefore optimal.

The fat rich product may be separated from the overflow of the hydrocyclone using any appropriate technology. The overflow stream will generally comprise a hot solution of fat/oil in ethanol, which can form a two-phase system simply upon cooling. This unique property is utilised in this invention, where the mere lowering the temperature of the ethanol-fat solution results in the formation of two layers, the lower heavier layer consisting mainly of fat/oil with 4-5% ethanol content only. In general, a temperature below 40° C. will be sufficient to create the two phases, although a temperature in the range of 10° C. to 30° C., e.g. about 25° C. is preferred. There is generally no lower limit to the temperature, although for practical reasons it should be above 0° C. Thus, in a specific embodiment of the invention the process further comprises the steps of:

cooling the overflow stream of the first hydrocyclone to a temperature of 40° C. or below to form an ethanolic upper phase and a lower phase, recovering the fat rich product from the lower phase, and optionally recycling the ethanolic upper phase in step ii).

When the process employs ethanol of high concentration, e.g. azeotropic ethanol, and the starting material has a water content below 3% w/w the lighter upper phase will remain undiluted and can be recycled to the extractor without further dehydration. However, if required the ethanolic upper phase may also be dehydrated before recycling the ethanol in step ii). Any method of dehydration of the ethanolic phase may be employed, such as molecular sieving using a zeolite. Other technologies for ethanol dehydration are well-known to the skilled person.

The fat reduced product may be recovered from the underflow of the hydrocyclone using any technology as appropriate. For example, the underflow may be subjected to centrifugal separation, e.g. in a decanter centrifuge, to provide the fat reduced product. The composition of the fat reduced product will depend on the fat containing starting material. Thus, for example, when the starting material is a slaughterhouse by-product the fat reduced product may be a protein product. A protein product may also be provided when the fat reduced product is an oil seed. Regardless of the nature of the fat containing starting material the fat reduced product may be subjected to any further processing as desired.

The process of the invention may employ a single hydrocyclone. However, in another embodiment the heated mixture is subjected to a sequential counter current processing in a series of hydrocyclone stages. In this embodiment, the fat reduced underflow stream of a hydrocyclone stage is fed to a down-stream hydrocyclone stage of the series, and the overflow stream of a hydrocyclone stage is fed to an up-stream hydrocyclone stage in the series, and the fat lean product is recovered from the fat reduced underflow stream of the last hydrocyclone stage of the series, and the fat rich product is recovered from the overflow stream of the first hydrocyclone stage of the series. In general, the feed stream to a hydrocyclone in the series will thus comprise the underflow stream from its up-stream hydrocyclone, which has been pooled with the overflow stream of its down-stream hydrocyclone. For example, when the process comprises N serially connected hydrocyclone stages the heated mixture is fed to a first hydrocyclone stage to provide a first fat reduced underflow stream and a first overflow stream, the first fat reduced underflow stream is then fed to a second hydrocyclone stage to provide a second fat reduced underflow stream and a second overflow stream, and subsequently for hydrocyclone stage n, where n=2 to N−1 the process comprises feeding the fat reduced underflow stream of hydrocyclone stage n together with the overflow of hydrocyclone stage n+2 to hydrocyclone stage n+1, to provide a fat reduced underflow stream n+1 and an overflow stream n+1, feeding the overflow stream n+1 to hydrocyclone stage n together with the underflow from hydrocyclone stage n−1, recovering the fat lean product from the fat reduced underflow stream of hydrocyclone stage N, recovering the fat rich product from the first overflow stream.

The feed to hydrocyclone N, where there is no down-stream hydrocyclone, comprises the underflow stream of hydrocyclone stage N−1 optionally together with a washing liquid. Hydrocyclone stage N provides the underflow stream from which the fat lean product may be recovered.

When the method comprises only a single stage this may be referred to as the first stage, and thus the overflow stream of this stage may be referred to as the overflow of the first stage, and the underflow stream of this stage may be referred to as the underflow stream of the first stage.

In general, the more hydrocyclone stages in a series the more efficient the extraction of fat from the starting material. The number of hydrocyclone stages, N, will typically be 3 or more or 4 or more. A preferred number of hydrocyclone stages in series is from 4 to 6. In further embodiments the heated mixture is subjected to hydrocyclone treatment in two or more hydrocyclones arranged in parallel, or each stage in a series of hydrocyclones comprises two or more hydrocyclones. Parallel hydrocyclone operation, e.g. that each stage comprises two or more hydrocyclones, allows easy scalability of the process. The process may for example comprise 50, 100, 250 or more hydrocyclones operated in parallel, e.g. each stage comprises 50, 100, 250 or more hydrocyclones. Each stage of hydrocyclones in the process need not comprise the same number of hydrocyclones. In a certain embodiment the respective overflow and underflow streams from a specific stage of hydrocyclones are pooled before subjecting to an up-stream or down-stream stage, respectively, of hydrocyclone treatment. For example, when a stage comprises 100 hydrocyclones, the underflow streams may be pooled to represent the underflow stream of the stage and the overflow streams may be pooled to represent the underflow stream of the stage. This embodiment allows that each stage is scaled appropriately according to the mass of the stream to be treated. The pooled streams may be distributed, e.g. evenly, to the corresponding next stage of hydrocyclone treatment according to the throughput provided by each hydrocyclone.

Any hydrocyclone may be employed in the invention. However, it is preferred that the hydrocyclone is of small scale. Thus, in an embodiment of the invention the diameter of the cylindrical upper part of the hydrocyclone is 25 mm or less, such as about 20 mm or about 15 mm or about 10 mm. Hydrocyclones in this scale may also be referred to as "cyclonettes", and in the following a 10 mm cyclonette may be referred to with the abbreviation "D10". The small diameter of the cyclonettes generates high g-force—and efficient separation of very fine particles. The cyclonettes still provide a high throughput, e.g. about 250-350 l/h per cyclonette when the feed contains about 14% w/w dry solids. When several cyclonettes are set up in parallel it can handle any flow rate. Furthermore, the cyclonettes, due to their small size, reduce the hazards from potential fires or explosions caused to the presence of ethanol at high concentration near its boiling point.

The size of the particles of the particulate fat containing starting material will be as is appropriate for the hydrocyclone, and the particle sizes may be reduced as desired using any appropriate technology. It is however preferred, that the mean diameter of the particles of the particulate fat containing starting material is from about 20 µm to about 300 µm, such as from about 30 µm to about 100 µm, such as about 50 µm. It is further preferred that the particles are monodisperse. In a specific embodiment of the invention the standard deviation, Dv95, of the mean diameter of the particles of the particulate fat containing starting material is therefore 50% or less from the mean diameter of the particles.

The preferred embodiment for the invention is a hydrocyclone arrangement in which the overflow stream from the first stage, e.g. of serially connected hydrocyclone stages, is fed to a clarifying separation, e.g. in a clarifying hydrocyclone stage or a series of clarifying hydrocyclones stages, in which suspended solids in the overflow stream of the first hydrocyclone stage are separated. The clarifying separation may also be accomplished using a centrifuge. The clarifying separation provides a clarified stream and a concentrated stream. The concentrated stream may be added to the feed of the 1$^{st}$ hydrocyclone stage. The fat rich product is recovered from the clarified stream from the clarifying separation. When the clarifying separation is a hydrocyclone separation the clarified stream may be referred to as the overflow of the clarifying hydrocyclone from which fat is to be recovered in the further process steps. The clarifying separation with hydrocyclones will, dependent on the quality of the oil rich feed material, preferably comprise 1 to 3 serially connected hydrocyclone stages.

Employment of a clarifying hydrocyclone advantageously minimises the suspended solids content in the fat rich product. In another aspect the invention relates to a fat rich product obtainable in the process of the invention, and in yet another aspect the invention relates to a fat lean product obtainable in the process of the invention. The products provided in the process of the invention can readily be employed for human or animal consumption due to the lack of noxious extractants, since ethanol as an extractant is considered compatible with food products and may additionally easily be removed to levels of no concern. Further uses of the fat rich product of the invention are for biofuel applications, e.g. as a material for producing biodiesel.

BRIEF DESCRIPTION OF THE FIGURES

The invention will be readily understood from the following detailed description in conjunction with the accompanying figures, in which.

DETAILED DESCRIPTION OF THE INVENTION

Figure 1:
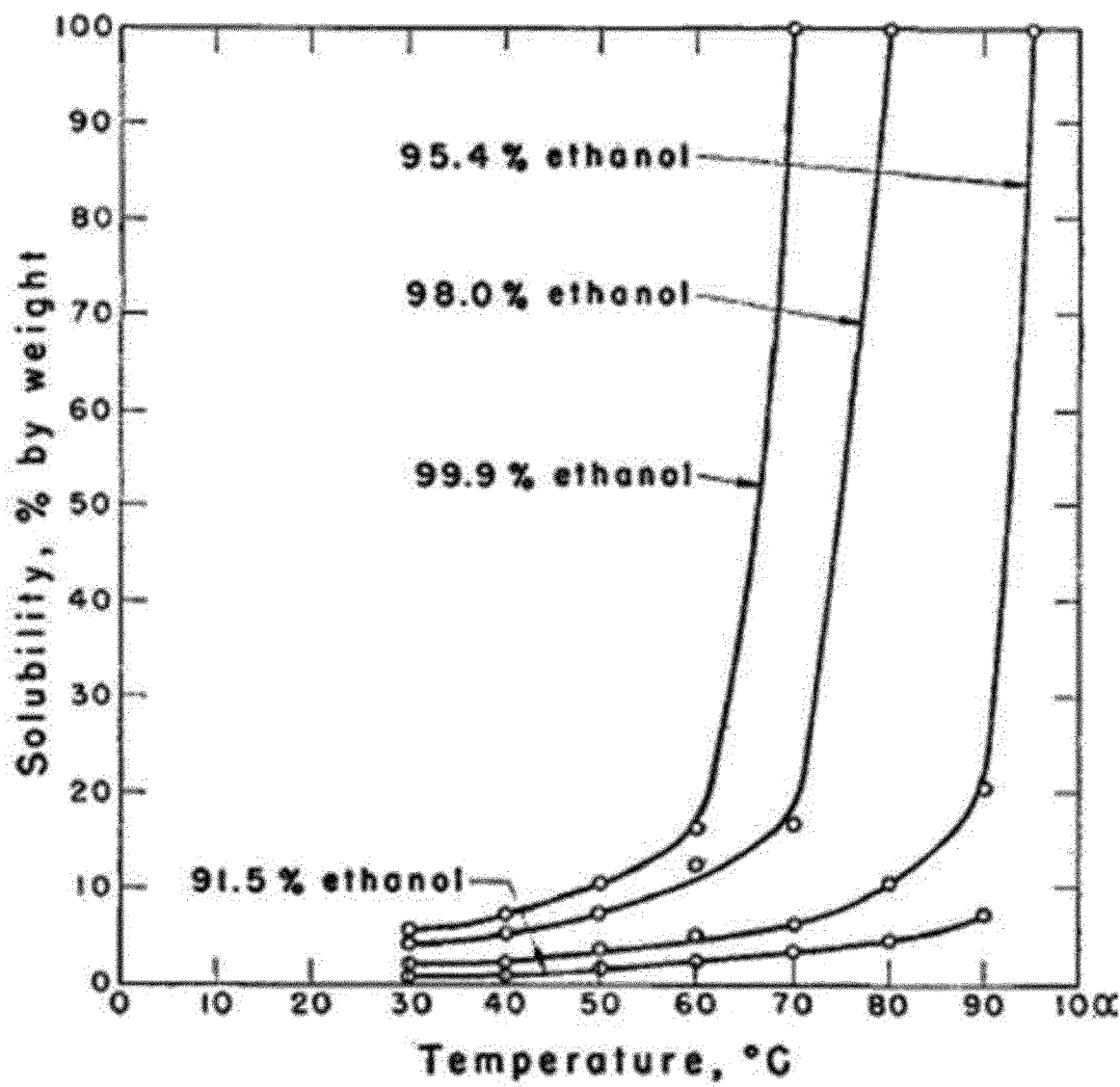
FIG. 1 shows the solubility of oil/fat in ethanol.

In order to more fully explain the invention it is disclosed in more detail below, and definitions of the terms used throughout the document are given.

The present invention relates to a process for the production of a fat rich and a fat lean product from a plant or animal starting material. In the context of the invention the term "fat" refers to a triglyceride of biological origin. The fat may also be referred to as "oil" and the two terms may be used interchangeably in the context of the invention.

The starting material is of plant or animal origin. Any plant commonly cultured to provide a plant oil may be used in the invention, and any part of such plant may be subjected to the process. Typical plant materials are derived from rapeseed, canola, soybean, sunflower seed, peanut, cottonseed, palm, palm kernel, coconut, olive, corn, grape seed, hazelnut and other nut, linseed, rice bran, safflower, sesame, etc. The plant material may for example be the press cake remains after extraction, e.g. expeller extraction, of the oilseeds. In general, any oilseed may be processed according to the invention. The animal may be any land animal, such as livestock, poultry etc. or marine animal, such as fish. In particular, the starting material may be derived from slaughterhouse by-product or dehydrated slaughterhouse by-products, or from by-product from industrial processing of fish.

The process of the invention employs ethanol. In the context of the invention "ethanol" is referred to in terms of concentration where the ethanol concentration is provided as a percentage by mass, i.e. % w/w. The balance will normally be water unless otherwise indicated. The ethanol may be referred to as "azeotropic" meaning that it contains 95.6% w/w ethanol and 4.4% w/w water. The term "absolute" ethanol refers to ethanol of at least 99.9% w/w concentration.

The enclosed nature, and also the small volume of the preferred hydrocyclone size, allows that the feed stream fed to the hydrocyclone is heated above its boiling point without evaporating when processed in the hydrocyclone. This effect of retaining a liquid state is referred to as "superheated" in the context of the invention. This is particularly advantageous since it allows that the mixture of the particulate fat containing starting material and the ethanol is heated to a temperature where the fat and oil of the particulate fat containing starting material are dissolved in the ethanol and thus may be extracted from particulate fat containing starting material.

The following abbreviations may be used to describe the present invention:

| Abbreviation | Term |
| --- | --- |
| SSP (in kg/h or in %) | Suspended Solid (protein) |
| L (in kg/h) | Liquid (alcohol) |
| T (in kg/h) | Mass flow (SSP + L) |
| FLOW (in m³/h) | Volume flow |
| S.G (in kg/m³) | Specific gravity |
| SLS (in kg/h) | Soluble Solids (fat) |
| TS (in kg/h) | Total Solids (SSP + SLS) |
| TS (in %) | Total Solids (SSP + SLS) |
| TOT (in kg/h) | Total mass flow (SSP + L + SSL) |
| F.L. | Fresh Liquid |
| W.L. | Washing Liquid |
| UF | Underflow |
| OF | Overflow |
| F | Feed flow |
| delta P | Pressure drop |
| D10 | Cyclonette with 10 mm upper diameter |

In a specific embodiment of the invention the fat containing starting material is a slaughterhouse by-product. This starting material typically contains about ⅔ water. In order to provide a shelf stable protein meal the water content needs to be reduced. Besides protein slaughterhouse by-products contain minerals and a varied quantity of fat depending on the specific by-product fraction. Slaughterhouse by-products can therefore appropriately be treated according to the invention. Conventional dehydration processes are very costly both in terms of energy usage, but also as large and expensive equipment is needed to transfer evaporation heat into wet products. Since products containing high fat levels have better heat conductivity, less drying surface is needed in indirect heaters, and the slaughterhouse by-product can be initially dehydrated according to the Carver-Greenfield process as outlined above.

Existing carver Greenfield installations typically use falling film tubular heat exchangers. However, the present inventors have now found that surprisingly it is possible to use conventional plate heat exchangers of the widegap type. Raising film flash plate cassette evaporators of flash or conventional type provide a compact though flexible and cost efficient design for making dehydration units. Obviously, solid particle size needs to be calibrated to at least less the clearance of the plate heat exchanger—and ideally less. For example, a cassette with an 8 mm clearance, will face significantly less risk of clogging if particle sizes are not more than 2-3 mm. Furthermore, the solid particles should ideally be spherical rather than fibrous. Fibres can be caught at supporting points between plates and also in the distribution channel. Consequently, the particle size reduction mill needs to be of a certain quality. We have found that high speed colloid pin mill in combination with a slotted safety filter provides stable particle size output. It has further proven advantageous, that proteinaceous material of animal origin is pre-minced in a conventional hole-plate grinder and thoroughly pre-coagulated before the final milling. Coagulated, even thoroughly milled raw materials tends to re-adhere into fibrous structures.

Smaller particle size further significantly shortens dehydration time as both heat penetration increases and also water/steam diffusion towards the surface is reduced. In conventional Carver Greenfield operations there is however a general reluctance to reduce particle size too much, as this will negatively affect the ability of expeller presses to build up high pressure thus extracting maximum amount of fat from final product. In this invention, however, we will not use expeller presses, but centrifuges, e.g. decanter centrifuges, as the fat left within the solids will be recovered in the following extraction phase. Decanters are not sensitive to product particle size, and will readily recover fine solids particles having a higher density than the carrying fat. Thus, following dehydration in the Carver Greenfield process the slurry may be subjected to solid-liquid separation in a decanter centrifuge to provide the particulate fat containing starting material and a liquid fat phase from which the fat rich product may be recovered.

The slaughterhouse by-product can for example be pre-milled in a hole-plate grinder followed be re-milling, e.g. by a pre-emulsifier, to provide a wet fatty product of a fineness that allows stable operation of the plate heat exchangers in the CG dehydration. Pre-milling may be done directly to the slaughterhouse by-product, whereas re-milling is typically done after suspending the pre-milled slaughterhouse by-product in ethanol.

Pending the milling system, the dehydrated product may still contain pieces (e.g. 2-3 mm) of bones and the like. To ensure that the particulate starting material is within the size range optimal for the operation of the hydrocyclones, the particulate material could undergo a re-milling after dispensing in ethanol, e.g. by a colloid wet-milling in combination with a classifying hydrocyclone treatment, where the underflow is recycled for re-milling, and the overflow containing appropriate sized product is subjected to the extraction process of the invention. The particle sizes of the materials may be monitored throughout the process.

The particulate fat containing starting material to be extracted is mixed with ethanol, milled to appropriate particle size in a colloid mill, preheated in an economiser system before final heating and feeding into the hydrocyclone extraction system. Extraction ethanol is fed into the hydrocyclone system counter-current to the product flow. The underflow of the last hydrocyclone station or stage containing defatted material, may be subjected to heat reduction before being fed to a decanter centrifuge for maximum ethanol removal prior to desolventising.

The overflow from the hydrocyclone treatment containing the fat/oil may be clarified using e.g. hydrocyclones in clarifying configuration and/or a high-speed disk stack centrifuge, before being chilled to separate the fat from the ethanol. After chilling down to e.g. 25° C. or less the optionally clarified overflow may be transferred to a column or cone shaped phase separator, or a disk stack centrifuge.

The recovered fat/oil contains minor amounts of ethanol which can be removed by conventional vacuum stripping technology. If required, phospholipids can be removed using conventional degumming technology, comprising addition of water and lye, mixing and separation.

Solid desolventising can be achieved with any known technology, being indirect heated vacuum driers or by superheated ethanol flash drying.

Processing of a slaughterhouse by-product according to the process of the invention provides a fat rich product comprising triglyceride fats from the material, and a fat lean product which may be referred to as a protein meal. Both the fat rich and the fat lean product can be used for human or animal consumption, e.g. as a component of an animal feed. The fat rich product may also be used as a starting material for the production of biodiesel or the like.

EXAMPLES

Example 1—Tests of Hydrocyclone Operating Conditions

A slaughterhouse by-product was treated according to the invention. The separation tests were done with a single 10 mm cyclonette fed with a suspension of fatty meal and alcohol. The fatty bone meal was prepared from the material, which had been dehydrated in a carver Greenfield process, pre-milled in a hammermill and was re-milled to a fineness that allowed a stable operation of the cyclonette and a proper recovery of solids.

The re-milling was done with a suspension, at TS concentration 32%, in a mill with double cone (both with ribbons) of which the clearance could be adjusted to a finer or courser milling.

The first separation test was made with a suspension, at TS concentration approximately 27%, that was re-circulated over the mill for 8 minutes at a clearance of 8/18 (indication on mill).

The test rig operated well for approximately half an hour and then plugged. To assure a consistent stable operation of the test rig it was decided to re-mill the starting material to a finer grade.

The additional re-milling was done during 10 minutes at the finest clearance 0/10 (0.1 mm clearance between the cones). The separation tests were done with this suspension.

Additional separation tests were done with a suspension, at a TS concentration of approximately 7%, from which the coarse fraction had been removed (by discharging the underflow from the cyclonette for a while). These tests were done to get an impression of the operation of clarifier stages that would be installed to clarify the overflow of "the washing station".

The test runs are summarised in Table 2 and Table 3. Table 2 shows the test of the hydrocyclone operating parameters without dry solids in the feed. The feed temperature was 22° C., and the feed specific weight was 800 kg/m$^3$. Table 3 shows the test of the hydrocyclone operating parameters with dry solids in the feed. Table 4 shows the results of hydrocyclone tests with dry solids. The feed temperature was 88° C., except in test 7, and the specific weight of the feed was 824 kg/m$^3$, except in test 12.

TABLE 2

Test of hydrocyclone operating parameters without dry solids.

| Test | Feed P (Bar) | OF P (Bar) | UF P (Bar) | Feed Flow (l/h) | delta P (Bar) | OF Flow (l/h) | UF Flow (l/h) | UF/F Flow |
|---|---|---|---|---|---|---|---|---|
| 1 | 3 | 0.4 | 0.4 | 294 | 2.6 | 105 | 189 | 0.64 |
| 2 | 4.1 | 0.8 | 0.8 | 338 | 3.3 | 136 | 202 | 0.60 |
| 3 | 5.3 | 1 | 0.8 | 363 | 4.3 | 140 | 223 | 0.61 |
| 4 | 6 | 1.1 | 1 | 405 | 4.9 | 150 | 255 | 0.63 |
| 5 | 6.9 | 1.2 | 1 | 425 | 5.7 | 159 | 266 | 0.63 |
| 6 | 7.6 | 1.4 | 1 | 431 | 6.2 | 167 | 264 | 0.61 |

TABLE 3

Test of hydrocyclone operating parameters with dry solids.

| Test | Feed P (Bar) | OF P (Bar) | UF P (Bar) | Feed Flow (l/h) | delta P (Bar) | OF Flow (l/h) | UF Flow (l/h) | UF/F Flow |
|---|---|---|---|---|---|---|---|---|
| 7* | 4.6 | 2 | 1.4 | 340 | 2.6 | 112 | 228 | 0.67 |
| 8 | 5.1 | 1.9 | 1.7 | 376 | 3.2 | 87 | 289 | 0.77 |
| 9 | 6.1 | 2.1 | 2 | 431 | 4 | 91 | 340 | 0.79 |
| 10 | 6.2 | 2.2 | 2.6 | 425 | 4 | 99 | 326 | 0.77 |
| 11 | 7.3 | 3.2 | 3.8 | 419 | 4.1 | 124 | 295 | 0.70 |
| 12** | 6 | 2 | 2.3 | 440 | 4 | 87 | 353 | 0.80 |
| 13** | | | | | | | | |

*Feed temperature was 86° C.
**Feed TS content was 25% and Feed specific weight was 840 kg/m³.

TABLE 4

Results of hydrocyclone tests with dry solids

| | OF solids | | UF solids | | TS recovery |
|---|---|---|---|---|---|
| Test | TS % | ml | TS % | ml | % |
| 7* | 3.5 | 0.8 | 26 | 3.2 | 80 |
| 8 | 4 | 0.5 | 33 | 3.7 | 88 |
| 9 | | 0.7 | 32 | 4 | 85 |
| 10 | | 0.6 | 32 | 4 | 87 |
| 11 | | | 33 | | |
| 12** | | | 32 | | |
| 13** | | | 34 | | |

*Feed temperature was 86° C.
**Feed TS content was 25% and Feed specific weight was 840 kg/m³.

From the initial experiments presented in Table 2 to Table 4 it is evident that
The cyclonette operates stably with consistent results at the tested concentrations and pressures
The cyclonette has a capacity at a delta P of 4 Bar of:
  at 0% TS, 380 l/h
  at 14% TS, 430 l/h
  at 25% TS, 440 l/h;
The maximum dry solids concentration in the underflow was 32-33%;
The dry solids concentration in the overflow was 3.5-4%;
The recovery of solids in the underflow was 85-88% of the dry solids;
Fat recovery was calculated to be 94% with 4 multi-cyclone washing stages;
Fat recovery was calculated to be 97% with 6 multi-cyclone washing stages.

Example 2—Simulations of Processes

Figure 2:
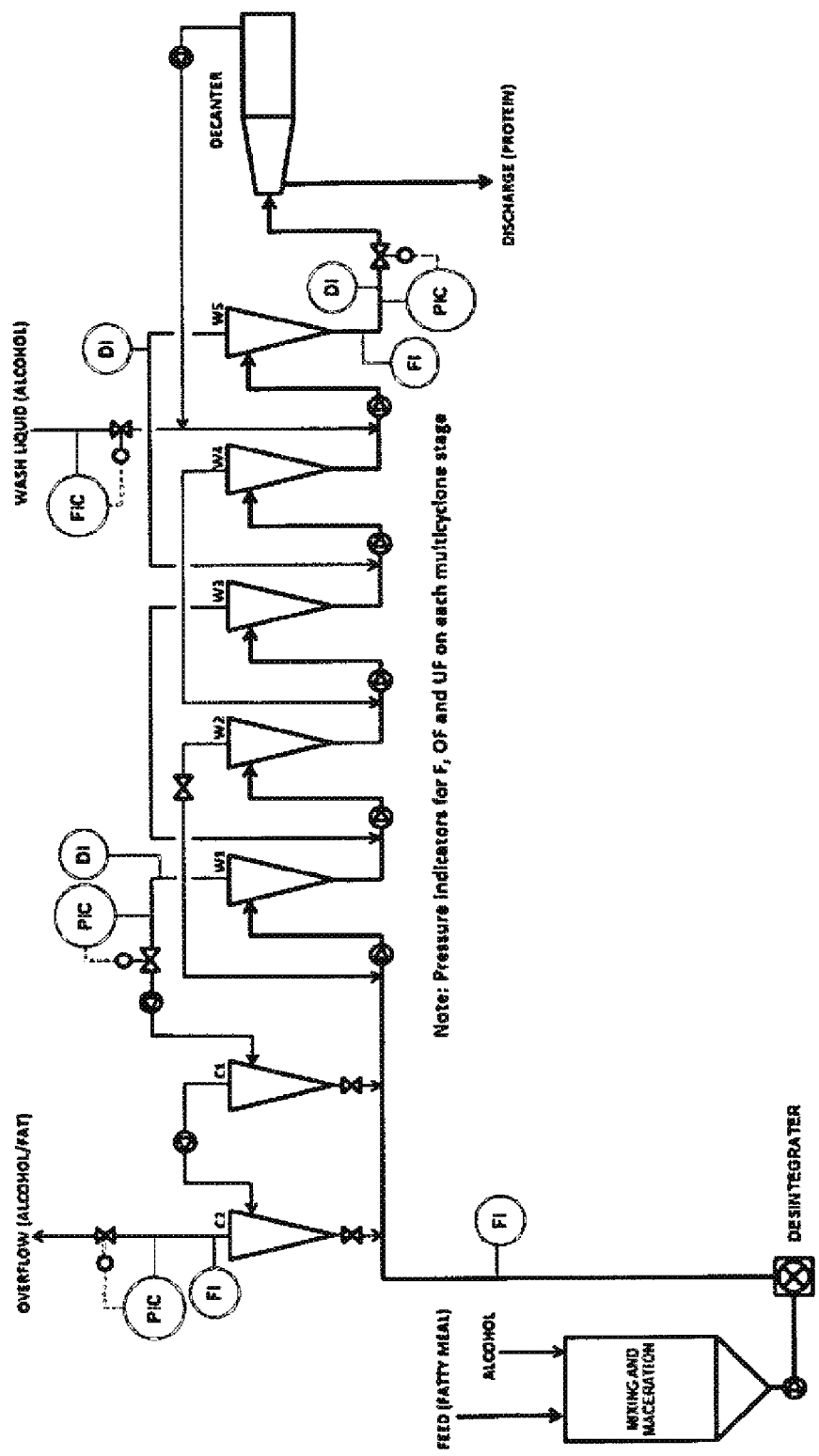
FIG. 2 shows a schematic process diagram of an embodiment of the invention.

FIG. 2 shows a schematic process diagram of a five stage process of the invention. In the process of FIG. 2 the particulate fat containing starting material ("Feed (fatty meal)") is mixed with ethanol ("alcohol") in a mixing tank ("Mixing and maceration") and led to a colloid mill ("Disintegrater") for further comminution. The mixture is fed to the hydrocyclone of the first stage ("W1"). The underflow of the first hydrocyclone is fed to the hydrocyclone of the second stage ("W2"), and the underflow and overflow streams of the second stage hydrocyclone are processed as described above in the subsequent stages of hydrocyclones, W3 to W5, respectively. The overflow of the first hydrocyclone W1 is clarified in a two-step hydrocyclone separation process where the overflow stream of the first clarification hydrocyclone C1 is fed to the second clarification hydrocyclone C2. The underflow streams from clarification hydrocyclones C1 and C2 are combined with the feed stream fed to the first stage hydrocyclone W1. The overflow stream of clarification hydrocyclone C2 is processed further by cooling to separate a fat phase from an ethanolic phase in a phase separator (not shown). The lower phase of the separator may optionally be further processed to provide the fat rich product, and the ethanolic upper phase may be recycled, optionally after dehydrating, to be mixed with the particulate fat containing starting material. The underflow stream from hydrocyclone W5 is subjected to a decanter centrifuge ("Decanter") to further concentrate the fat lean product ("Discharge (protein)") from the W5 underflow. The overflow of the decanter is combined with the feed stream to hydrocyclone W5. The set-up also comprises a line for applying a washing liquid ("Wash liquid (alcohol)") to the final stage hydrocyclone and/or to the W5 underflow. This washing liquid may be combined with the clarified stream from the decanter centrifuge. It is to be understood that while FIG. 2 only shows a single hydrocyclone for each stage, any number of hydrocyclones may operate in parallel at a single stage.

The results obtained in Example 1 were employed to simulate multistage processes having 4, 5 or 6 stages using an empiric mathematical model used and verified in the starch washing industry. The multistage set-ups for the simulations were as illustrated in FIG. 2 except that the numbers of stages were as indicated below. Table 5 shows the default parameters that were used in all three simulations.

TABLE 5

Defaults for process simulations

| | |
|---|---|
| F.L. rate | 4 kg/kg TS |
| Protein recovery in hydrocyclone | 85 % of SSP in F |
| Fat concentration OF | 70 % of fat concentration UF |
| Rest fat in protein | 1 % of SSP |
| Specific weight alcohol | 800 kg/m3 |
| Specific weight fat | 900 kg/m3 |
| Specific weight protein | 1050 kg/m3 |

4 Stage Process
The simulations of the 4-stage process are summarised in the tables below.

TABLE 6-1

Feed stream to W1

| | NEW FEED | UF C2 | UF C1 |
|---|---|---|---|
| SSP in kg/h | 700* | 22 | 127 |
| L in kg/h | 3967 | 258 | 1146 |
| T in kg/h | 4667 | 281 | 1274 |

TABLE 6-1-continued

Feed stream to W1

|  | NEW FEED | UF C2 | UF C1 |
|---|---|---|---|
| FLOW in m³/h | 5.6 | 0.3 | 1.5 |
| SSP in % | 15* | 8* | 10* |
| S.G in kg/m³ | 834 | 842 | 833 |
| SLS in kg/h | 300* | 140 | 280 |
| TS in kg/h | 1000 | 162 | 408 |
| TS in % | 20.1 | 38.6 | 26.2 |
| TOT in kg/h | 4967 | 421 | 1554 |

*indicates a default value for the calculations

TABLE 6-2

Feed streams streams of W1 to W4

|  | F W1 | F W2 | F W3 | F W4 |
|---|---|---|---|---|
| SSP in kg/h | 999 | 995 | 969 | 824 |
| L in kg/h | 11064 | 7813 | 7015 | 6382 |
| T in kg/h | 12063 | 8807 | 7984 | 7205 |
| FLOW in m³/h | 14.7 | 10.7 | 9.7 | 8.8 |
| SSP in % | 8.3 | 11.3 | 12.1 | 11.4 |
| S.G in kg/m³ | 822 | 825 | 825 | 823 |
| SLS in kg/h | 1015 | 399 | 140 | 45 |
| TS in kg/h | 2015 | 1393 | 1108 | 868 |
| TS in % | 15.4 | 15.1 | 13.6 | 12.0 |
| TOT in kg/h | 13078 | 9206 | 8124 | 7250 |

TABLE 6-3

Underflow streams of W1 to W4

|  | UF W1 | UF W2 | UF W3 | UF W4 |
|---|---|---|---|---|
| SSP in kg/h | 849 | 845 | 824 | 700 |
| L in kg/h | 2548 | 2121 | 1750 | 1488 |
| T in kg/h | 3397 | 2966 | 2574 | 2188 |
| FLOW in m³/h | 4.0 | 3.5 | 3.0 | 2.5 |
| SSP in % | 25* | 28.5 | 32 | 32* |
| S.G in kg/m³ | 854 | 860 | 867 | 866 |
| SLS in kg/h | 304 | 108 | 45 | 13.60 |
| TS in kg/h | 1153 | 954 | 868 | 714 |
| TS in % | 31.2 | 31.0 | 33.2 | 32.4 |
| TOT in kg/h | 3701 | 3074 | 2618 | 2201 |

*indicates a default value for the calculations

TABLE 6-4

Overflow streams of W1 to W4 and C1 to C2

|  | OF C2 | OF C1 | OF W1 | OF W2 | OF W3 | OF W4 |
|---|---|---|---|---|---|---|
| SSP in kg/h | 0 | 22 | 150 | 149 | 145 | 124 |
| L in kg/h | 7111 | 7370 | 8516 | 5692 | 5265 | 4894 |
| T in kg/h | 7111 | 7392 | 8666 | 5841 | 5411 | 5018 |
| FLOW in m³/h | 8.9 | 9.2 | 10.7 | 7.2 | 6.7 | 6.2 |
| SSP in % | 0 | 0.3 | 1.7 | 2.6 | 2.7 | 2.5 |
| S.G in kg/m³ | 800 | 805 | 810 | 809 | 807 | 805 |
| SLS in kg/h | 291 | 431 | 711 | 290 | 95 | 31 |
| TS in kg/h | 291 | 453 | 861 | 440 | 240 | 155 |
| TS in % | 3.9 | 5.8 | 9.2 | 7.2 | 4.4 | 3.1 |
| TOT in kg/h | 7402 | 7823 | 9377 | 6132 | 5505 | 5049 |

TABLE 6-5

Fresh feeds and decanter centrifuge streams

|  | F.L. | W.L. | OF DEC | UF DEC |
|---|---|---|---|---|
| SSP in kg/h | 0 | 0 | 0 | 700 |
| L in kg/h | 4000 | 4632 | 632 | 856 |
| T in kg/h | 4000 | 4632 | 632 | 1556 |
| FLOW in m³/h | 5 | 5.8 | 0.79 | 1.7 |
| SSP in % | 0 | 0 | 0 | 45* |
| S.G in kg/m³ | 800 | 800 | 800 | 896 |
| SLS in kg/h | 0 | 0 | 0 | 8 |
| TS in kg/h | 0 | 0 | 0 | 708 |
| TS in % | 0 | 0 | 0 | 45.3 |
| TOT in kg/h | 4000 | 4632 | 632 | 1563 |

*indicates a default value for the calculations

TABLE 6-6

Pump settings and number of cyclones per stage

|  | Feed pumps | | | | Cyclonettes |
|---|---|---|---|---|---|
|  | Flow m³/h | S.G. kg/m³ | Delta P Bar | Power kW | D10 Pieces |
| C1 | 10.7 | 805 | 4* | 0.7 | 28 |
| C2 | 9.2 | 810 | 4* | 0.6 | 24 |
| W1 | 14.7 | 822 | 4* | 0.9 | 34 |
| W2 | 10.7 | 825 | 4* | 0.7 | 25 |
| W3 | 9.7 | 825 | 4* | 0.6 | 23 |
| W4 | 8.8 | 823 | 4* | 0.6 | 20 |

*indicates a default value for the calculations

5 Stage Process

The simulations of the 5-stage process are summarised in the tables below.

TABLE 7-1

Feed stream to W1

|  | NEW FEED | UF C2 | UF C1 |
|---|---|---|---|
| SSP in kg/h | 700* | 22 | 127 |
| L in kg/h | 3967 | 259 | 1147 |
| T in kg/h | 4667 | 281 | 1275 |
| FLOW in m³/h | 5.6 | 0.3 | 1.5 |
| SSP in % | 15* | 8* | 10* |
| S.G in kg/m³ | 838 | 844 | 836 |
| SLS in kg/h | 300* | 143 | 294 |
| TS in kg/h | 1000 | 166 | 422 |
| TS in % | 20.1 | 39.0 | 26.9 |
| TOT in kg/h | 4967 | 424 | 1569 |

*indicates a default value for calculations

TABLE 7-2

Feed streams of W1 to W5

|  | F W1 | F W2 | F W3 | F W4 | F W5 |
|---|---|---|---|---|---|
| SSP in kg/h | 1000 | 999 | 995 | 969 | 824 |
| L in kg/h | 10435 | 7192 | 6439 | 6059 | 5750 |
| T in kg/h | 11435 | 8191 | 7434 | 7028 | 6574 |
| FLOW in m³/h | 13.8 | 9.9 | 8.9 | 8.4 | 7.9 |
| SSP in % | 8.7 | 12.2 | 13.4 | 13.8 | 12.5 |
| S.G in kg/m³ | 826 | 831 | 832 | 832 | 829 |
| SLS in kg/h | 1071 | 465 | 196 | 93 | 34 |
| TS in kg/h | 2071 | 1464 | 1191 | 1061 | 857 |
| TS in % | 16.6 | 16.9 | 15.6 | 14.9 | 13.0 |
| TOT in kg/h | 12506 | 8656 | 7630 | 7120 | 6607 |

TABLE 7-3

Underflow streams of W1 to W5

|  | UF W1 | UF W2 | UF W3 | UF W4 | UF W5 |
|---|---|---|---|---|---|
| SSP in kg/h | 850 | 849 | 845 | 824 | 700 |
| L in kg/h | 2550 | 2130 | 1796 | 1750 | 1488 |
| T in kg/h | 3399 | 2980 | 2642 | 2574 | 2188 |
| FLOW in m³/h | 3.9 | 3.4 | 3.0 | 2.9 | 2.5 |
| SSP in % | 25* | 28.5 | 32 | 32 | 32* |
| S.G in kg/m³ | 862 | 869 | 877 | 877 | 877 |
| SLS in kg/h | 338 | 138 | 70 | 34 | 11.30 |
| TS in kg/h | 1188 | 987 | 915 | 857 | 711 |
| TS in % | 31.8 | 31.7 | 33.8 | 32.9 | 32.3 |
| TOT in kg/h | 3738 | 3117 | 2711 | 2607 | 2199 |

*indicates a default value for the calculations

TABLE 7-4

Overflow streams of W1 to W5 and C1 to C2

|  | OF C2 | OF C1 | OF W1 | OF W2 | OF W3 | OF W4 | OF W5 |
|---|---|---|---|---|---|---|---|
| SSP in kg/h | 0 | 22 | 150 | 150 | 149 | 145 | 124 |
| L in kg/h | 6479 | 6738 | 7885 | 5062 | 4643 | 4309 | 4263 |
| T in kg/h | 6479 | 6760 | 8035 | 5212 | 4792 | 4454 | 4386 |
| FLOW in m³/h | 8.1 | 8.4 | 9.9 | 6.4 | 5.9 | 5.5 | 5.4 |
| SSP in % | 0 | 0.3 | 1.9 | 2.9 | 3.1 | 3.3 | 2.8 |
| S.G in kg/m³ | 800 | 806 | 811 | 811 | 809 | 808 | 807 |
| SLS in kg/h | 295 | 438 | 733 | 327 | 126 | 59 | 23 |
| TS in kg/h | 295 | 461 | 883 | 477 | 276 | 204 | 146 |
| TS in % | 4.4 | 6.4 | 10.1 | 8.6 | 5.6 | 4.5 | 3.3 |
| TOT in kg/h | 6774 | 7199 | 8768 | 5539 | 4918 | 4513 | 4409 |

TABLE 7-5

Fresh feeds and decanter centrifuge streams

|  | F.L. | W.L. | OF DEC | UF DEC |
|---|---|---|---|---|
| SSP in kg/h | 0 | 0 | 0 | 700 |
| L in kg/h | 4000 | 4632 | 632 | 856 |
| T in kg/h | 4000 | 4632 | 632 | 1556 |
| FLOW in m³/h | 5 | 5.8 | 0.79 | 1.7 |
| SSP in % | 0 | 0 | 0 | 45* |
| S.G in kg/m³ | 800 | 800 | 800 | 912 |
| SLS in kg/h | 0 | 0 | 0 | 6 |
| TS in kg/h | 0 | 0 | 0 | 706 |
| TS in % | 0 | 0 | 0 | 45.2 |
| TOT in kg/h | 4000 | 4632 | 632 | 1562 |

*indicates a default value for the calculations

TABLE 7-6

Pump settings and number of cyclones per stage

|  | Feed pumps | | | | Cyclonettes |
|---|---|---|---|---|---|
|  | Flow m³/h | S.G. kg/m³ | Delta P Bar | Power kW | D10 Pieces |
| C1 | 9.9 | 806 | 4* | 0.6 | 26 |
| C2 | 8.4 | 811 | 4* | 0.5 | 22 |
| W1 | 13.8 | 826 | 4* | 0.9 | 32 |
| W2 | 9.9 | 831 | 4* | 0.6 | 23 |
| W3 | 8.9 | 832 | 4* | 0.6 | 21 |
| W4 | 8.4 | 832 | 4* | 0.5 | 20 |
| W5 | 7.9 | 829 | 4* | 0.5 | 18 |

*indicates a default value for the calculations

6 Stage Process
The simulations of the 6-stage process are summarised in the tables below.

TABLE 8-1

Feed stream to W1

|  | NEW FEED | UF C2 | UF C1 |
|---|---|---|---|
| SSP in kg/h | 700* | 22 | 127 |
| L in kg/h | 3967 | 259 | 1147 |
| T in kg/h | 4667 | 281 | 1275 |
| FLOW in m³/h | 5.6 | 0.3 | 1.5 |
| SSP in % | 15* | 8* | 10* |
| S.G in kg/m³ | 838 | 844 | 836 |
| SLS in kg/h | 300* | 142 | 286 |
| TS in kg/h | 1000 | 165 | 413 |
| TS in % | 20.1 | 38.9 | 26.5 |
| TOT in kg/h | 4967 | 424 | 1561 |

*indicates a default value for the calculations

TABLE 8-2

Feed streams of W1 to W6

|  | F W1 | F W2 | F W3 | F W4 | F W5 | F W6 |
|---|---|---|---|---|---|---|
| SSP in kg/h | 1000 | 1000 | 999 | 995 | 969 | 824 |
| L in kg/h | 11067 | 7826 | 7081 | 6745 | 6691 | 6382 |
| T in kg/h | 12067 | 8826 | 8080 | 7740 | 7660 | 7205 |
| FLOW in m³/h | 14.6 | 10.7 | 9.7 | 9.3 | 9.2 | 8.7 |
| SSP in % | 8.3 | 11.3 | 12.4 | 12.8 | 12.6 | 11.4 |
| S.G in kg/m³ | 824 | 829 | 829 | 830 | 829 | 826 |
| SLS in kg/h | 1034 | 421 | 165 | 77 | 34 | 12 |
| TS in kg/h | 2034 | 1421 | 1165 | 1072 | 1003 | 835 |
| TS in % | 15.5 | 15.4 | 14.1 | 13.7 | 13.0 | 11.6 |
| TOT in kg/h | 13101 | 9247 | 8246 | 7817 | 7694 | 7217 |

TABLE 8-3

Underflow streams of W1 to W6

|  | UF W1 | UF W2 | UF W3 | UF W4 | UF W5 | UF W6 |
|---|---|---|---|---|---|---|
| SSP in kg/h | 850 | 850 | 849 | 845 | 824 | 700 |
| L in kg/h | 2550 | 2132 | 1804 | 1796 | 1750 | 1488 |
| T in kg/h | 3400 | 2982 | 2654 | 2642 | 2574 | 2188 |
| FLOW in m³/h | 3.9 | 3.4 | 3.0 | 3.0 | 2.9 | 2.5 |
| SSP in % | 25* | 28.5 | 32 | 32 | 32 | 32* |
| S.G in kg/m³ | 862 | 869 | 877 | 877 | 877 | 877 |
| SLS in kg/h | 310 | 115 | 54 | 26 | 12 | 3.50 |
| TS in kg/h | 1160 | 965 | 903 | 872 | 835 | 704 |
| TS in % | 31.3 | 31.1 | 33.4 | 32.7 | 32.3 | 32.1 |
| TOT in kg/h | 3710 | 3097 | 2708 | 2668 | 2585 | 2191 |

*indicates a default value for the calculations

TABLE 8-4

Overflow streams of W1 to W6 and C1 to C2

|  | OF C2 | OF C1 | OF W1 | OF W2 | OF W3 | OF W4 | OF W5 | OF W6 |
|---|---|---|---|---|---|---|---|---|
| SSP in kg/h | 0 | 22 | 150 | 150 | 150 | 149 | 145 | 124 |
| L in kg/h | 7111 | 7370 | 8517 | 5694 | 5277 | 4949 | 4941 | 4894 |
| T in kg/h | 7111 | 7392 | 8667 | 5844 | 5426 | 5098 | 5086 | 5018 |
| FLOW in m$^3$/h | 8.9 | 9.2 | 10.7 | 7.2 | 6.7 | 6.3 | 6.3 | 6.2 |
| SSP in % | 0 | 0.3 | 1.7 | 2.6 | 2.8 | 2.9 | 2.9 | 2.5 |
| S.G in kg/m$^3$ | 800 | 806 | 810 | 810 | 808 | 807 | 807 | 806 |
| SLS in kg/h | 296 | 439 | 724 | 306 | 111 | 51 | 23 | 8 |
| TS in kg/h | 296 | 461 | 874 | 456 | 261 | 200 | 168 | 132 |
| TS in % | 4.0 | 5.9 | 9.3 | 7.4 | 4.7 | 3.9 | 3.3 | 2.6 |
| TOT in kg/h | 7407 | 7831 | 9392 | 6151 | 5538 | 5149 | 5109 | 5026 |

TABLE 8-5

Fresh feeds and decanter centrifuge streams

|  | F.L. | W.L. | OF DEC | UF DEC |
|---|---|---|---|---|
| SSP in kg/h | 0 | 0 | 0 | 700 |
| L in kg/h | 4000 | 4632 | 632 | 856 |
| T in kg/h | 4000 | 4632 | 632 | 1556 |
| FLOW in m$^3$/h | 5 | 5.8 | 0.79 | 1.7 |
| SSP in % | 0 | 0 | 0 | 45* |
| S.G in kg/m$^3$ | 800 | 800 | 800 | 912 |
| SLS in kg/h | 0 | 0 | 0 | 2 |
| TS in kg/h | 0 | 0 | 0 | 702 |
| TS in % | 0 | 0 | 0 | 45.1 |
| TOT in kg/h | 4000 | 4632 | 632 | 1558 |

*indicates a default value for the calculations

TABLE 8-6

Pump settings and number of cyclones per stage

|  | Feed pumps | | | | Cyclonettes |
|---|---|---|---|---|---|
|  | Flow m$^3$/h | S.G. kg/m$^3$ | Delta P Bar | Power kW | D10 Pieces |
| C1 | 10.7 | 806 | 4* | 0.7 | 28 |
| C2 | 9.2 | 810 | 4* | 0.6 | 24 |
| W1 | 14.6 | 824 | 4* | 0.9 | 34 |
| W2 | 10.7 | 829 | 4* | 0.7 | 25 |
| W3 | 9.7 | 829 | 4* | 0.6 | 23 |
| W4 | 9.3 | 830 | 4* | 0.6 | 22 |
| W5 | 9.2 | 829 | 4* | 0.6 | 21 |
| W6 | 8.7 | 826 | 4* | 0.6 | 20 |

*indicates a default value for the calculations

Summary of Multi-Stage Simulations

The results with respect to recovery of fat relative to the particulate fat containing starting material are indicated in Table 9.

TABLE 9

Fat recovery in multistage separation

| Number of stages | Fat recovery (%) |
|---|---|
| 4 | 95.1 |
| 5 | 95.5 |
| 6 | 97.0 |

It is clear from the simulations that the process affords a high capacity. For example, with a volumetric flow of 5.6 m$^3$/h each stage of hydrocyclone treatment requires from 18 to 35 cyclonettes depending on the number of the stage in the process. This number of cyclonettes can be easily implemented in a process using standardised equipment readily available.

The invention claimed is:

1. A process for producing two products from plant or animal starting material, one of the two products being relatively lipid rich compared to the other product so that the one product is a lipid rich product and the other product is a lipid lean product, the process comprising:
   i) providing a particulate lipid containing starting material,
   ii) mixing the particulate lipid containing starting material with ethanol of at least 90% w/w concentration to produce a mixture,
   iii) heating the mixture to a temperature of at least 60° C. to produce a heated mixture in which lipid is solubilized in the ethanol,
   iv) subjecting the heated mixture to a hydrocyclone treatment to extract lipid from the particulate lipid containing starting material using the ethanol as an extractant and provide an underflow stream with a reduced lipid content relative to the heated mixture and an overflow stream comprising a solution of lipid in ethanol, the heated mixture being at a temperature of at least 60° C. throughout the extraction of the lipid from the particulate lipid containing starting material using the ethanol as the extractant,
   v) the subjecting the heated mixture to the hydrocyclone treatment comprising subjecting the heated mixture to sequential counter current processing in a plurality of hydrocyclones arranged one after another in a downstream direction so that the lipid reduced underflow stream of a first of the hydrocyclones is fed to a second of the hydrocyclones that is located downstream of the first hydrocyclone, the first hydrocyclone being upstream of the second hydrocyclone, and so that the overflow stream of one of the hydrocyclones is fed to an up-stream hydrocyclone;
   vi) recovering the lipid lean product from the lipid reduced underflow stream of a last hydrocyclone of the plurality of hydrocyclones, and vii) recovering the lipid rich product from the overflow stream of the first hydrocyclone.

2. The process according to claim 1, wherein the overflow stream of the first hydrocyclone stage is subjected to a clarifying separation to provide a clarified stream and a concentrated stream.

3. The process according to claim 2, wherein clarifying separation comprises a series of from 1 to 3 hydrocyclone stages, or the clarifying separation is accomplished using a centrifuge.

4. The process according to claim 1, further comprising:
cooling the overflow stream of the first hydrocyclone stage to a temperature of 40° C. or below to form an ethanolic upper phase and a lower phase,
recovering the fat rich product from the lower phase, and optionally recycling the ethanolic upper phase.

5. The process according to claim 1, wherein the heated mixture is subjected to hydrocyclone treatment in two or more hydrocyclones arranged in parallel or wherein each stage in a series of hydrocyclones comprises two or more hydrocyclones.

6. The process according to claim 1, wherein the number of hydrocyclone stages in the series is 3 or more.

7. The process according to claim 1, wherein a diameter of an upper part of the hydrocyclone is 25 mm or less.

8. The process according to claim 1, wherein the mean diameter of the particles of the particulate lipid containing starting material is from about 20 μm to about 300 μm.

9. The process according to claim 1, wherein a standard deviation Dv95 of a mean diameter of the particles of the particulate lipid containing starting material is 50% or less from the mean diameter of the particles.

10. The process according to claim 1, wherein the particulate lipid containing starting material has a water content below 3% w/w.

11. The process according to claim 1, wherein the temperature is at least 65° C.

12. The process according to claim 1, wherein the heated mixture of the particulate lipid containing starting material and ethanol is superheated above a boiling point of the mixture.

13. The process according to claim 1, wherein the ethanol concentration is at least 95% w/w.

14. The process according to claim 4, wherein the ethanolic upper phase is dehydrated before the recycling of the ethanolic upper phase.

15. The process according to claim 1 further comprising reducing a water content of the particulate lipid containing starting material to below 3% w/w in the steps of:
a) mixing the particulate lipid containing starting material with 1 to 20 parts lipid to obtain a slurry,
b) heating the slurry to evaporate water and to obtain a water reduced slurry,
c) subjecting the water reduced slurry to a solid-liquid separation to provide the particulate lipid containing material having a water content below 3% w/w and a lipid fraction.

16. The process according to claim 15, wherein step b) is performed as a multi-step process comprising subjecting the water reduced slurry to sequential heat treatments, where each subsequent heat treatment is performed at a lower temperature than a preceding heat treatment.

17. The process according to claim 15, wherein the lipid is derived from the lipid rich product produced according to steps i)-vi).

18. The process according to claim 15, wherein the lipid rich product is recovered from the lipid fraction.

19. The process according to claim 1, wherein the lipid reduced underflow stream is subjected to centrifugation to produce the lipid lean product.

20. The process according to claim 1, wherein the starting material is slaughterhouse by-products, dehydrated slaughterhouse by-products, fish by-products, oil seeds, or a press cake remains after extraction of oilseeds.

21. The process according to claim 1, wherein the underflow stream and the overflow stream in each hydrocyclone are the only flows resulting from each hydrocyclone.

22. A process for producing two products from plant or animal starting material, one of the two products being relatively lipid rich compared to the other product so that the one product is a lipid rich product and the other product is a lipid lean product, the process comprising:
i) providing a particulate lipid containing plant or animal starting material;
ii) mixing the particulate lipid containing plant or animal starting material with ethanol of at least 90% w/w concentration to produce a mixture in which lipid is solubilized in the ethanol;
iii) subjecting the mixture to a hydrocyclone treatment to extract lipid from the particulate lipid containing starting material using the ethanol as an extractant to provide an underflow stream with a reduced lipid content relative to the mixture and an overflow stream comprising a solution of lipid in ethanol, the mixture being at a temperature of at least the boiling point of the ethanol throughout the extraction of the lipid from the particulate lipid containing starting material using the ethanol as the extractant;
iv) the subjecting the heated mixture to the hydrocyclone treatment comprising subjecting the heated mixture to sequential counter current processing in a plurality of hydrocyclones arranged one after another in a downstream direction so that the lipid reduced underflow stream of a first of the hydrocyclones is fed to a second of the hydrocyclones that is located downstream of the first hydrocyclone, the first hydrocyclone being upstream of the second hydrocyclone, and so that the overflow stream of one of the hydrocyclones is fed to an up-stream hydrocyclone
v) recovering the lipid lean product with the reduced lipid content from the underflow stream; and
vi) recovering the lipid rich product from the overflow stream.

23. A process for producing two products from plant or animal starting material, one of the two products being relatively lipid rich compared to the other product so that the one product is a lipid rich product and the other product is a lipid lean product, the process comprising:
i) providing a particulate lipid containing plant or animal starting material;
ii) mixing the particulate lipid containing plant or animal starting material with ethanol of at least 90% w/w concentration to produce a mixture in which lipid is solubilized in the ethanol;
iii) subjecting the mixture to a hydrocyclone treatment to extract lipid from the particulate lipid containing starting material using the ethanol as an extractant to provide an underflow stream with a reduced lipid content relative to the mixture and an overflow stream comprising a solution of lipid in ethanol, the lipid being extracted from the particulate lipid containing starting material using the ethanol as the extractant while the mixture is at a temperature of at least 60° C.;

iv) the subjecting of the mixture to the hydrocyclone treatment comprising subjecting the mixture at the temperature of at least 60° C. to a sequential counter current processing in a plurality of hydrocyclones arranged one after another in a downstream direction so that the lipid reduced underflow stream of a first of the hydrocyclones is fed to a second of the hydrocyclones that is located downstream of the first hydrocyclone, the first hydrocyclone being upstream of the second hydrocyclone, and the overflow stream of one of the hydrocyclones is fed to an up-stream hydrocyclone, and the lipid lean product is recovered from the lipid reduced underflow stream of a last hydrocyclone of the plurality of hydrocyclones, and the lipid rich product is recovered from the overflow stream of the first hydrocyclone, the plurality of hydrocyclones being at least three hydrocyclones;

v) recovering the lipid lean product from the underflow stream with the reduced lipid content; and vi) recovering the lipid rich product from the overflow stream.

* * * * *